No. 799,929. PATENTED SEPT. 19, 1905.
R. H. NICHOLSON.
AUTOMATIC STOP MECHANISM.
APPLICATION FILED DEC. 14, 1904.

WITNESSES:
Edw. J. Hodge
S. E. Tomlinson

INVENTOR
Robt. H. Nicholson.
BY Herbert W. Jenner.
Attorney

UNITED STATES PATENT OFFICE.

ROBERT H. NICHOLSON, OF WILKESBARRE, PENNSYLVANIA.

AUTOMATIC STOP MECHANISM.

No. 799,929.    Specification of Letters Patent.    Patented Sept. 19, 1905.

Application filed December 14, 1904. Serial No. 236,853.

*To all whom it may concern:*

Be it known that I, ROBERT H. NICHOLSON, a citizen of the United States, residing at Wilkesbarre, in the county of Luzerne and State of Pennsylvania, have invented certain new and useful Improvements in Automatic Stop Mechanisms; and I do hereby declare the following to be a full, clear, and exact description of the invention, such as will enable others skilled in the art to which it appertains to make and use the same.

This invention relates to automatic stop mechanism used in connection with hoisting-engines in connection with mine-shafts, slopes, and planes; and it consists in the novel construction and combination of the parts hereinafter fully described and claimed.

Figure 1:
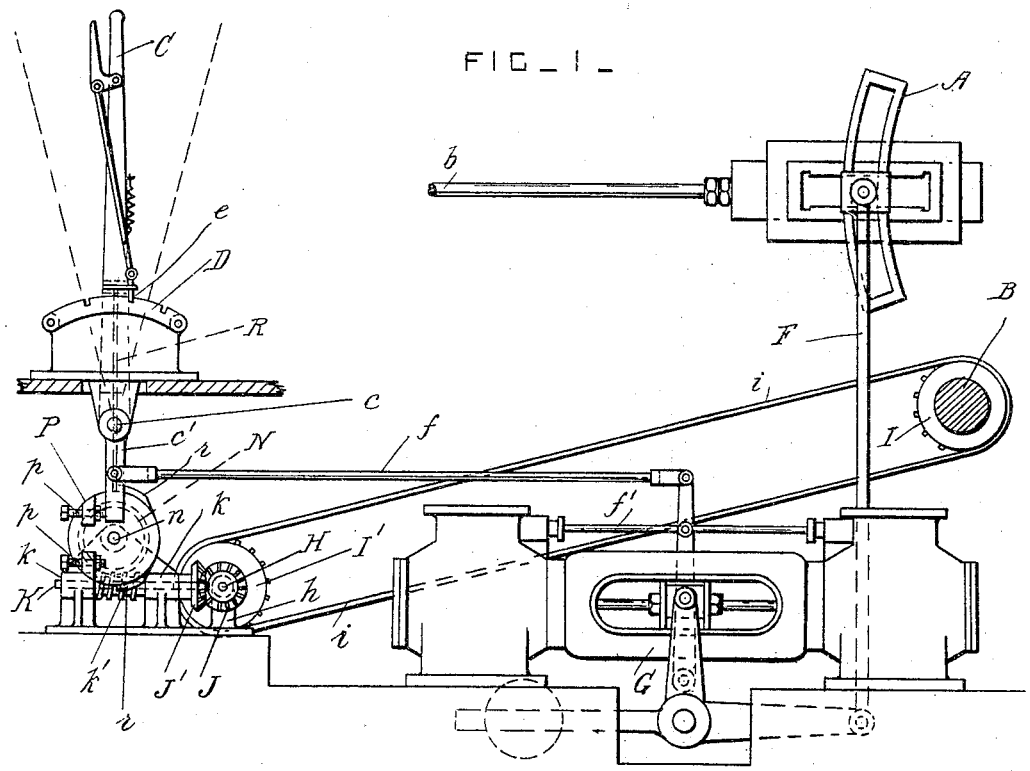
Figure 2:
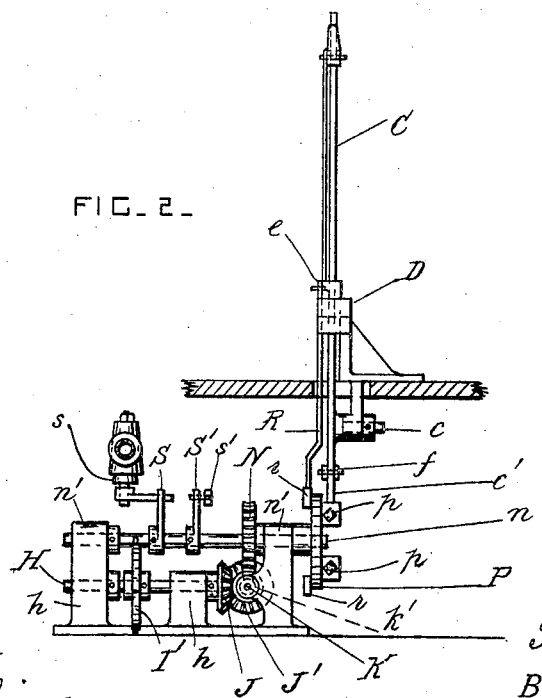

In the drawings, Figure 1 is a front view of the stop mechanism, showing also portions of the hoisting-engine arranged in the form of a diagram. Fig. 2 is a side view of the stop mechanism.

A is the reversing-link of the link motion of any approved winding or hoisting engine, such as used in connection with mines, and $b$ is the valve-rod of the slide-valve or other steam-supply valve of the said engine. B is the drum-shaft of the said engine or any other shaft which is revolved by the said engine. The said winding-engine is not herein more fully described or shown, as it is of any approved construction.

C is the lever for reversing the valve. This lever is pivoted by a pin $c$ to any approved stationary support or bracket, and D is the usual quadrant provided with notches. The lever C is provided with a catch $e$ of any approved construction for engaging with the notched quadrant. The reversing-lever is shown in its middle position when the slide-valve is on its center and the steam is cut off, and the dotted lines in Fig. 1 indicate the positions of the reversing-lever at the ends of its movement and in which the valve drives the engine in one direction or the other.

The reversing-lever C may be connected direct to the rod F, which shifts the link A in any approved manner; but in the drawings the lever C is shown connected by a rod $f$ to a steam reversing-engine G. This steam reversing-engine is of any approved construction and is connected positively with the shifting rod F, the rod $f$ being coupled to the valve-rod $f'$ of the reversing-engine. The reversing-engine is an auxiliary to the said winding-engine, and its function is to reverse the position of the link A in the valve-gear of the said winding-engine.

The automatic stop mechanism is provided so as to stop the winding-engine by placing the link A in its middle position when the winding-engine has made a prearranged number of revolutions and the mine-cage has arrived at a certain point.

H is a shaft journaled in stationary bearings $h$ and arranged parallel with the winding or drum shaft B.

I is a driving-wheel secured on the shaft B.

I' is a driving-wheel secured on the shaft H, and $i$ is a driving connection, such as a chain, which passes around the said wheels. A beveled toothed wheel J is secured on the shaft H.

J' is a beveled toothed wheel which is secured on a shaft K, which is journaled in stationary bearings $k$. The wheels J and J' are geared together, and a worm $k'$ is also secured on the shaft K.

N is a worm-wheel which is secured on a shaft $n$, which is journaled in stationary bearings $n'$ and which is driven by the said worm.

P is a disk which is also secured on the shaft $n$, and $p$ indicates tappets carried by the said disk. These tappets are preferably adjustable, and they may be adjusted singly or simultaneously in any approved manner. Adjustable screw-tappets are shown; but any other approved tappets may be used.

The reversing-lever C is provided with an extension $c'$, which is arranged in the path of the tappets $p$. The disk or plate P is also provided with cams $r$, and R is a trip-rod which is operatively connected to the catch $e$ of the reversing-lever and arranged in the path of the cams or projections $r$.

S and S' are two arms which are secured on the shaft $n$. The arm S is arranged to open a steam-valve $s$, which is arranged in the steam-supply pipe of a steam-actuated brake for the winding-engine. The arm S' is arranged to operate a rod $s'$, which opens relief-valves at the ends of the steam-cylinder of the said winding-engine, so that any steam which may get into the ends of the steam-cylinder by reason of its slide-valve leaking when placed on the center may be allowed to escape.

The plate or disk P is revolved continuously while the engine is at work. When the cage arrives at a prearranged point and the engine has made a prearranged number of revolutions, one of the cams $r$ disengages the catch of the reversing-lever and one of the tappets $p$ strikes the extension of the said reversing-lever and pushes the lever to its middle position, as shown in Fig. 1. The cam permits the catch to reëngage with the quadrant directly the lever is in its middle position. The supply of steam to the engine is cut off and the brake is applied and the cylinder-relief valves are opened. The tappet prevents the reversing-lever from being moved backward to start the engine in the wrong direction, but permits it to be reversed. The other tappet operates in a similar manner when the engine has made a prearranged number of revolutions in the reverse direction.

What I claim is—

1. In a stop mechanism, the combination, with the reversing-gear of a winding-engine, and a locking device for the said reversing-gear; of tappet mechanism operatively connected with the said engine and actuating the said reversing-gear automatically when the engine has made a prearranged number of revolutions, and means for unlocking the said reversing-gear automatically while it is being actuated by the said tappet mechanism.

2. In a stop mechanism, the combination, with the reversing-gear of an engine provided with a locking-catch, of a revoluble plate, driving mechanism between the said plate and engine, a cam carried by the said plate and operating to unlock the said catch when the said engine has made a prearranged number of revolutions, and a tappet carried by the said plate and operating the reversing-gear when its said catch is unlocked.

3. In a stop mechanism, the combination, with the reversing-lever of an engine provided with an extension, of a revoluble plate, driving mechanism between the said plate and engine, and two adjustable tappets carried by the said plate and striking the said lever extension when the engine has made a prearranged number of revolutions first in one direction and then in the opposite direction.

4. In a stop mechanism, the combination, with the reversing-lever of an engine provided with an extension, of a revoluble plate, driving mechanism between the said plate and engine, a locking-catch for the reversing-lever, a trip-rod connected to the said catch, a cam at the periphery of the said plate for operating the said trip-rod and catch, and a tappet carried by the face of the said plate and striking the said lever extension when the engine has made a prearranged number of revolutions.

In testimony whereof I have affixed my signature in the presence of two witnesses.

R. H. NICHOLSON.

Witnesses:
  WM. S. TREMBATH,
  A. C. CAMPBELL.